(12) United States Patent
Nishino

(10) Patent No.: US 10,189,538 B2
(45) Date of Patent: Jan. 29, 2019

(54) BICYCLE HYDRAULIC OPERATING DEVICE

(71) Applicant: Shimano Inc., Sakai, Osaka (JP)

(72) Inventor: Takafumi Nishino, Sakai (JP)

(73) Assignee: SHIMANO INC., Osaka (JP)

( * ) Notice: Subject to any disclaimer, the term of this patent is extended or adjusted under 35 U.S.C. 154(b) by 333 days.

(21) Appl. No.: 14/230,002

(22) Filed: Mar. 31, 2014

(65) Prior Publication Data

US 2015/0274252 A1    Oct. 1, 2015

(51) Int. Cl.
*B62L 3/02* (2006.01)
*B62M 25/08* (2006.01)
*B62K 23/06* (2006.01)

(52) U.S. Cl.
CPC .............. *B62L 3/023* (2013.01); *B62K 23/06* (2013.01); *B62M 25/08* (2013.01)

(58) Field of Classification Search
CPC ......... B62K 23/06; B62L 3/023; B62M 26/08
See application file for complete search history.

(56) References Cited

U.S. PATENT DOCUMENTS

| | | | | |
|---|---|---|---|---|
| 4,921,081 A * | 5/1990 | Chilcote | ................ | B62L 3/023 188/344 |
| 6,527,303 B2 * | 3/2003 | Kariyama | ............... | B60T 1/065 285/246 |
| 6,804,961 B2 * | 10/2004 | Lumpkin | ................ | B60T 11/22 188/26 |
| 7,546,909 B2 * | 6/2009 | Campbell | ............... | B60T 11/22 188/24.15 |
| 7,854,180 B2 * | 12/2010 | Tetsuka | .................. | B62K 23/06 74/473.12 |
| 8,714,322 B2 * | 5/2014 | Dunlap | ................... | B62L 3/023 188/344 |
| 9,233,730 B2 * | 1/2016 | Kariyama | ............... | B62L 3/023 |
| 2012/0160625 A1 | 6/2012 | Jordan | | |
| 2013/0180815 A1 | 7/2013 | Dunlap et al. | | |
| 2013/0255239 A1 * | 10/2013 | Miki | ...................... | B62L 3/023 60/325 |
| 2013/0305872 A1 * | 11/2013 | Fukao | ....................... | B62L 3/02 74/502.2 |
| 2014/0174236 A1 * | 6/2014 | Nakakura | .............. | B62M 25/08 74/473.14 |
| 2015/0090550 A1 * | 4/2015 | Matsueda | ............... | B62L 3/023 188/344 |
| 2015/0259025 A1 * | 9/2015 | Sala | ....................... | B62K 23/06 74/473.12 |

FOREIGN PATENT DOCUMENTS

| | | |
|---|---|---|
| EP | 0375436 A2 | 6/1990 |
| EP | 1816065 A2 | 8/2007 |
| JP | 3182210 U * | 3/2013 ............ B62M 25/08 |

* cited by examiner

*Primary Examiner* — Michael Leslie
*Assistant Examiner* — Matthew Wiblin

(57) ABSTRACT

A bicycle hydraulic operation device includes a bracket configured to be attached to a bicycle part. A hydraulic cylinder is provided on the bracket, and a piston is located within the hydraulic cylinder. An attachment bore provided on the bracket, and the attachment bore is connected with the hydraulic cylinder. The attachment bore includes a step. At least part of the attachment bore is arranged in an area that radially surrounds the hydraulic cylinder.

18 Claims, 7 Drawing Sheets

BICYCLE HYDRAULIC OPERATING DEVICE

BACKGROUND

The present invention relates to a bicycle hydraulic operating device.

The bicycle industry is constantly improving the various components of the bicycle. In recent years, some bicycles have been provided with a bicycle hydraulic system. The bicycle hydraulic system typically includes a hydraulic operating device. There is an ongoing need to reduce the number of parts, to simplify the parts, and to reduce the cost of the components of the hydraulic operating device.

SUMMARY

In view of the need for an improved hydraulic operating device, one aspect of the present invention is to provide a bicycle hydraulic operation device that includes the following: a bracket configured to be attached to a bicycle part, and the bracket includes a grip portion configured to be gripped by a rider; a hydraulic cylinder provided on the bracket, and the hydraulic cylinder has a cylinder axis; a piston located within the hydraulic cylinder, and the piston is movable in an axial direction of the hydraulic cylinder; and an attachment bore provided on the bracket. The attachment bore is connected with the hydraulic cylinder so that fluid flows through the attachment bore in response to movement of the piston. The attachment bore includes a step, and at least part of the attachment bore is arranged in an area that radially surrounds the hydraulic cylinder.

In another aspect of the present invention, the attachment bore has a threaded portion.

In another aspect of the present invention, the bicycle hydraulic operation device further includes a hose, a compression sleeve and a connecting bolt. The hose extends through the connecting bolt and the compression sleeve, and the connecting bolt is adapted to be threaded to the thread portion to compress the compression sleeve between the step and the connecting bolt.

In another aspect of the present invention, the bicycle hydraulic operation device further includes a passage connecting the attachment bore to the hydraulic cylinder. The passage has a smaller diameter than the attachment bore.

In another aspect of the present invention, the hose attachment bore includes a first diameter section and a second diameter section. The second diameter section has a larger diameter than the first diameter of the second diameter section and is arranged further from the hydraulic cylinder than the first diameter section. The step is formed between the first diameter section and the second diameter section.

In another aspect of the present invention, the hydraulic cylinder and the attachment bore are both defined by bores formed in the bracket.

In another aspect of the present invention, the piston moves between a rest position and an actuated position. The piston is farther away from the bicycle part in the actuated position than in the rest position. An opening of the attachment bore faces toward the bicycle part in a state where the bracket is attached to the bicycle part in a normal use position.

In another aspect of the present invention, an angle formed between the cylinder axis of the hydraulic cylinder and a longitudinal axis of the attachment bore is equal to or less than ninety degrees.

In another aspect of the present invention, the bicycle hydraulic operation device further includes a mechanical shifting unit provided on the bracket.

In another aspect of the present invention, the bicycle hydraulic operation device further includes a lever pivotally mounted on the bracket, and an electrical switch unit provided on at least one of the bracket and the lever.

Another aspect of the present invention is to provide the following: a bracket including a proximal end portion configured to be attached to a bicycle part, a distal end portion, which is opposite to the proximal end portion, and a grip portion, which extends between the proximal end portion and the distal end portion and is configured to be gripped by a rider. A hydraulic cylinder is provided on the bracket. A piston is located within the hydraulic cylinder, and the piston is movable in an axial direction of the hydraulic cylinder. An attachment bore provided on the bracket, and the attachment bore is connected with the hydraulic cylinder so that fluid flows through the attachment bore in response to movement of the piston. The attachment bore includes a step. The attachment bore is closer to the distal end portion than the proximal end portion.

In another aspect of the present invention, the hydraulic cylinder has a cylinder axis, and at least part of the attachment bore is arranged in an area radially surrounding the hydraulic cylinder.

In another aspect of the present invention, the bicycle hydraulic operation device further includes a mechanical shifting unit provided on the bracket.

In another aspect of the present invention, the bicycle hydraulic operation device further includes a lever pivotally mounted on the bracket, and an electrical switch unit provided on at least one of the bracket and the lever.

Another aspect of the present invention is to provide the following: a bracket including a grip portion configured to be gripped by a rider; a mechanical shifting unit provided on the bracket; a hydraulic cylinder provided on the bracket; and a piston located within the hydraulic cylinder, wherein the piston is movable in an axial direction of the hydraulic cylinder; and an attachment bore provided on the bracket. The attachment bore is connected with the hydraulic cylinder so that fluid flows through the attachment bore in response to movement of the piston. The attachment bore includes a step.

In another aspect of the present invention, the hydraulic cylinder has a cylinder axis, and at least part of the attachment bore is arranged in an area radially surrounding the hydraulic cylinder.

In another aspect of the present invention, the bracket includes a proximal end portion, which is configured to be attached to a bicycle part, and a distal end portion, which is opposite to the proximal end portion, wherein the grip portion extends between the proximal end portion and the distal end portion, and the attachment bore is closer to the distal end portion than the proximal end portion.

DESCRIPTION OF THE EMBODIMENTS

Various embodiments of the bicycle hydraulic operating device will now be described with reference to the drawings. It will be apparent to those skilled in the art from this disclosure that the following descriptions of the embodiments are provided for illustration only and not for the purpose of limiting the invention as defined by the appended claims and their equivalents.

Figure 1:
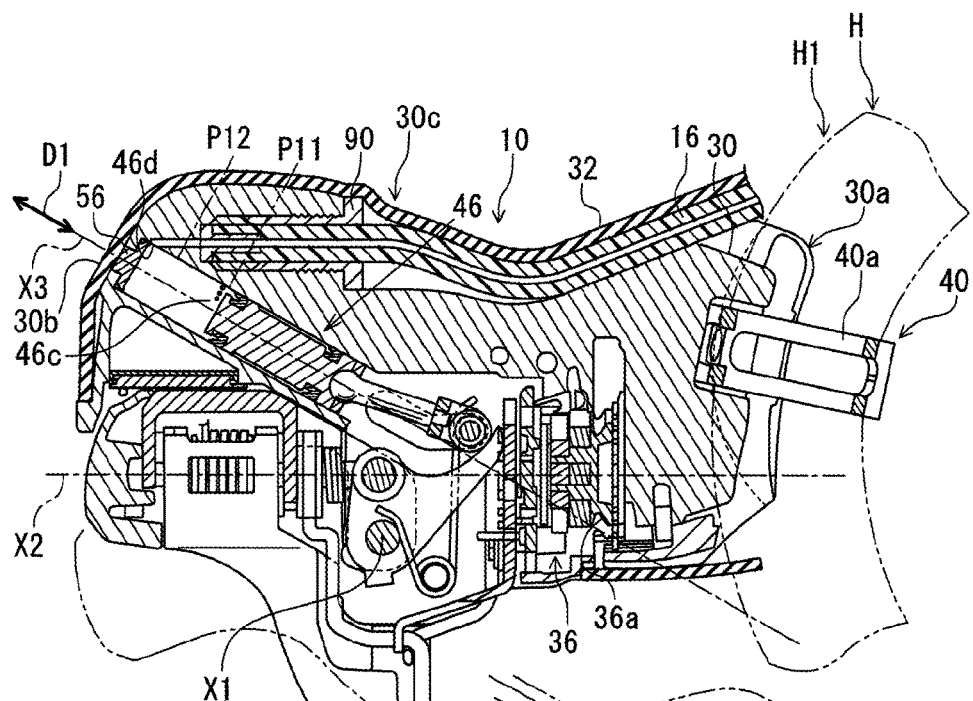
FIG. 1 is a cross sectional view of a bicycle hydraulic operating device.

Referring to FIG. 1, a bicycle hydraulic operating device 10 in accordance with the first embodiment is illustrated. The bicycle hydraulic operating device 10 is configured to be attached to a handlebar H of a bicycle. The handlebar H is a dropdown handlebar, for example. The bicycle hydraulic operating device 10 is configured to operate a hydraulic brake device (not shown: e.g. a hydraulic disc brake caliper or a hydraulic rim brake) to apply a braking force to a bicycle wheel (not shown). The bicycle hydraulic operating device 10 is configured to be coupled to the hydraulic brake device via a hydraulic hose 16 (hereinafter "hose" simply).

The bicycle hydraulic operating device 10 is further configured to operate a transmission (not shown: e.g. a derailleur or an internal hub gear) to shift gears. The bicycle hydraulic operating device 10 is configured to be coupled to the transmission via an operation cable. The operation cable is a mechanical cable such as a Bowden cable having an inner cable.

As described above, the bicycle hydraulic operating device 10 includes both a braking function and a shifting function in a single unit. However, it will be apparent to those skilled in the bicycle field from the present disclosure that the shifting function can be eliminated from the bicycle hydraulic operating device 10 if needed and/or desired.

The bicycle hydraulic operating device 10 is a right hand side operating device configured to be operated by a rider's right hand. However, it will be apparent to those skilled in the bicycle field from the present disclosure that the configuration of the bicycle hydraulic operating device 10 can be adapted to a left hand side operating device configured to be operated by the rider's left hand.

In the present application, the following directional terms "front", "rear", "forward", "rearward", "left", "right", "transverse", "upward" and "downward" as well as any other similar directional terms refer to those directions which are determined on the basis of the rider who sits on a saddle (now shown) of the bicycle with facing the handlebar H, for example. Accordingly, these terms, as used to describe the bicycle hydraulic operating device 10, should be interpreted relative to the bicycle as used in an upright riding position on a horizontal surface.

As seen in FIG. 1, the bicycle hydraulic operating device 10 is mounted to a curved section H1 of the handlebar H. In other words, the bicycle hydraulic operating device 10 is particularly designed for a bicycle that is equipped with the dropdown handlebar such as the handlebar H. However, it will be apparent to those skilled in the bicycle field from the present disclosure that the bicycle hydraulic operating device 10 can be applied to different types of handlebars if needed and/or desired.

As illustrated in FIG. 1, the bicycle hydraulic operating device 10 includes the hose 16, a bracket 30, a grip cover 32, a lever 34, and a mechanical shifting unit 36, or cable operating mechanism. The mechanical shifting unit 36 is provided on the bracket 30. The mechanical shifting unit 36 includes a take-up member 36a coupled to the inner cable of the operation cable (not shown), a take-up mechanism (not shown), and a release mechanism (not shown). The take-up member 36a is configured to be rotated in a take-up direction by the take-up mechanism to take-up or pull the inner cable. Further, the take-up member 36a is configured to be rotated in a release direction opposite to the take-up direction by the release mechanism to release the inner cable. Since such movement of the take-up member is well known in the bicycle field and the mechanical shifting unit 36 is substantially the same as the mechanical shifting unit shown in publication US2012-0297919A1, the mechanical shifting unit 36 will not be discussed herein for the sake of brevity.

In the illustrated embodiment, the grip cover 32 is attached to the bracket 30 to at least partially cover the bracket 30. The grip cover 32 is made of an elastic material such as rubber. The lever 34 is pivotally mounted on a pivot shaft 35 provided on the bracket 30. The lever 34 is to be pivoted around a pivot axis X1 of the pivot shaft 35 relative to the bracket 30 between a rest position P1 and an operated position P2. In the illustrated embodiment, the lever 34 is biased from the operated position P2 to the rest position P1 with respect to the bracket 30. The pivotal movement of the lever 34 is restricted by a stopper (not shown) between the rest position P1 and the operated position P2. The lever 34 is configured to perform a braking operation of the hydraulic brake device.

Figure 2:
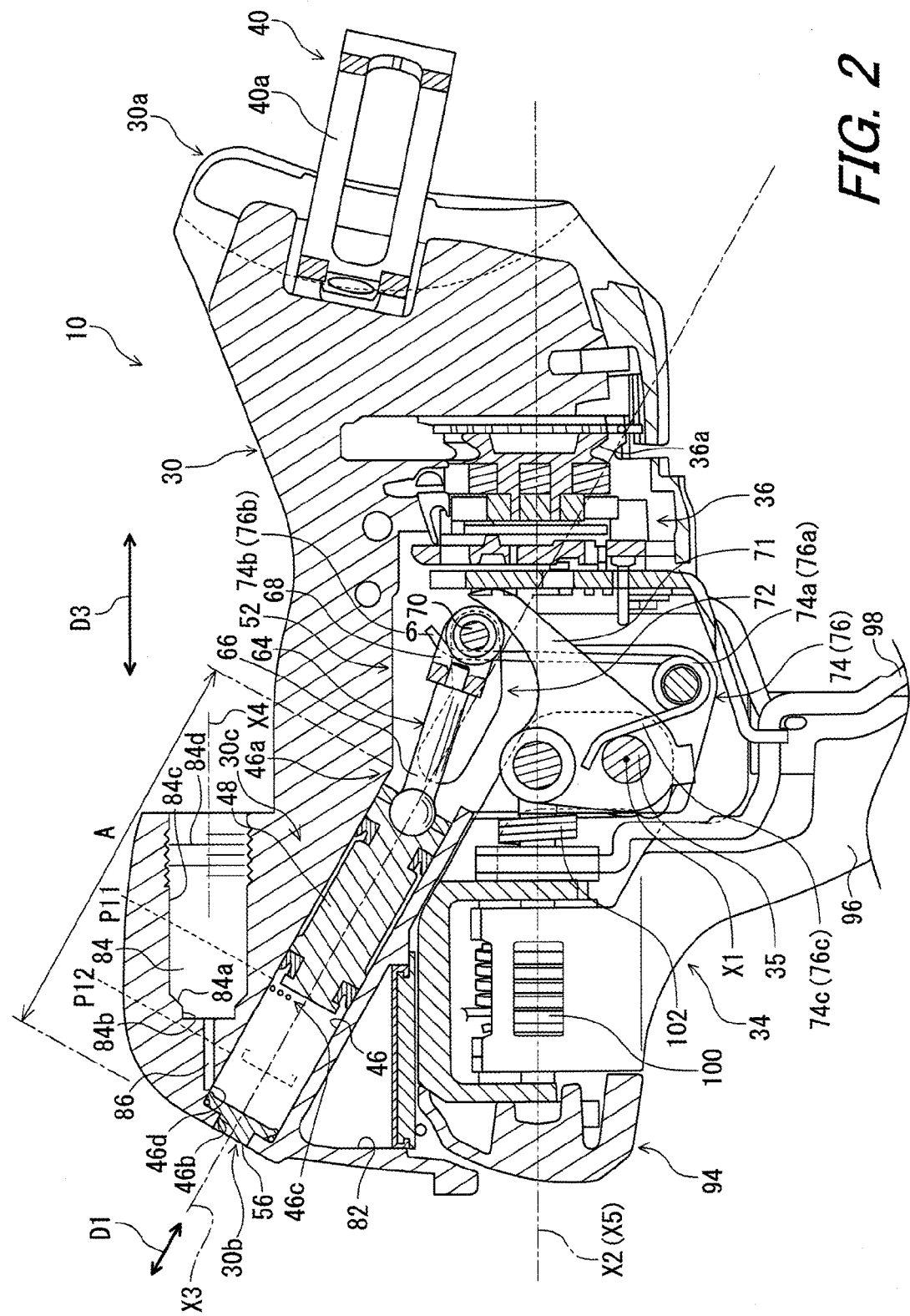
FIG. 2 is a partial enlarged cross sectional view of the bicycle hydraulic operating device of FIG. 1.

As seen in FIG. 2, the bracket 30 has a longitudinal axis X2, which extends in a longitudinal direction D3. The bracket 30 includes a proximal end portion 30a configured to be attached to the handlebar H (i.e., a bicycle part), a distal end portion 30b, which is opposite to the proximal end portion 30a, and a grip portion 30c extending between the proximal end portion 30a and the distal end portion 30b. The grip portion 30c is configured to be gripped by the rider. The bracket 30 is made of a rigid and/or hard material such as a metallic material or a resin material.

A mounting member 40 is mounted to the proximal end portion 30a. The mounting member 40 is configured to couple the bracket 30 to the handlebar H. The mounting member 40 is a handlebar clamp configured to be attached to the bracket 30 for securing the bracket 30 to the curved section H1 of the handlebar H in a releasable manner. In the illustrated embodiment, the mounting member 40 includes a band 40a configured to be coupled to the proximal end portion 30a. The proximal end portion 30a is arranged at an opposite side of the lever 34 and is configured to contact the curved section H1 (FIG. 1) of the handlebar H when a fastener (not shown) is tightened to move the band 40a towards the proximal end portion 30a.

As seen in FIG. 2, the bicycle hydraulic operating device 10 further includes a hydraulic cylinder 46 and a piston 48. The hydraulic cylinder 46 is provided on the bracket 30. The hydraulic cylinder 46 is defined by a bore formed in the bracket 30. The hydraulic cylinder 46 extends in an axial direction D1. The hydraulic cylinder 46 has a cylinder axis X3. The axial direction D1 is defined along the cylinder axis X3 of the hydraulic cylinder 46, for example. In the illustrated embodiment, the hydraulic cylinder 46 is at least partially provided in the grip portion 30c of the bracket 30 and is integrally provided in the bracket 30 as a one-piece unitary member.

The piston 48 is configured to be movable in the axial direction D1 within the hydraulic cylinder 46 relative to the bracket 30. As seen in FIG. 1, the lever 34 is operatively coupled to the piston 48 to move the piston 48 in a reciprocal manner, in response to pivotal movement of the lever 34 around the pivot axis X1 from the rest position P1 to the operated position P2.

As illustrated in FIG. 2, the hydraulic cylinder 46 includes a first end 46a, a second end 46b, which is opposite to the first end 46a, a first port 46c, and a second port 46d. The first end 46a is open to an internal space 52 of the bracket 30. The mechanical shifting unit 36 and a part of the lever 34 are located in the internal space 52, for example. The piston 48 and the internal surface of the hydraulic cylinder 46 define a cylinder chamber. The cylinder chamber is configured to be filled with hydraulic fluid. The second end 46b is formed as an open end. The second end 46b is arranged at the distal end portion 30b of the bracket 30. The second end 46b is plugged by a plug member 56.

The bicycle hydraulic operating device 10 further includes an intermediate member 64 configured to be operatively coupled to the piston 48. The intermediate member 64 is configured to transmit the pivotal movement of the lever 34 to the piston 48. The piston 48 is movable between a rest position P11 and an actuated position P12. In a state where the lever 34 is in the rest position P1, the piston 48 is positioned at the rest position P11. In a state where the lever 34 is operated to the operated position P2, the piston 48 is positioned at the actuated position P12.

Figure 3:
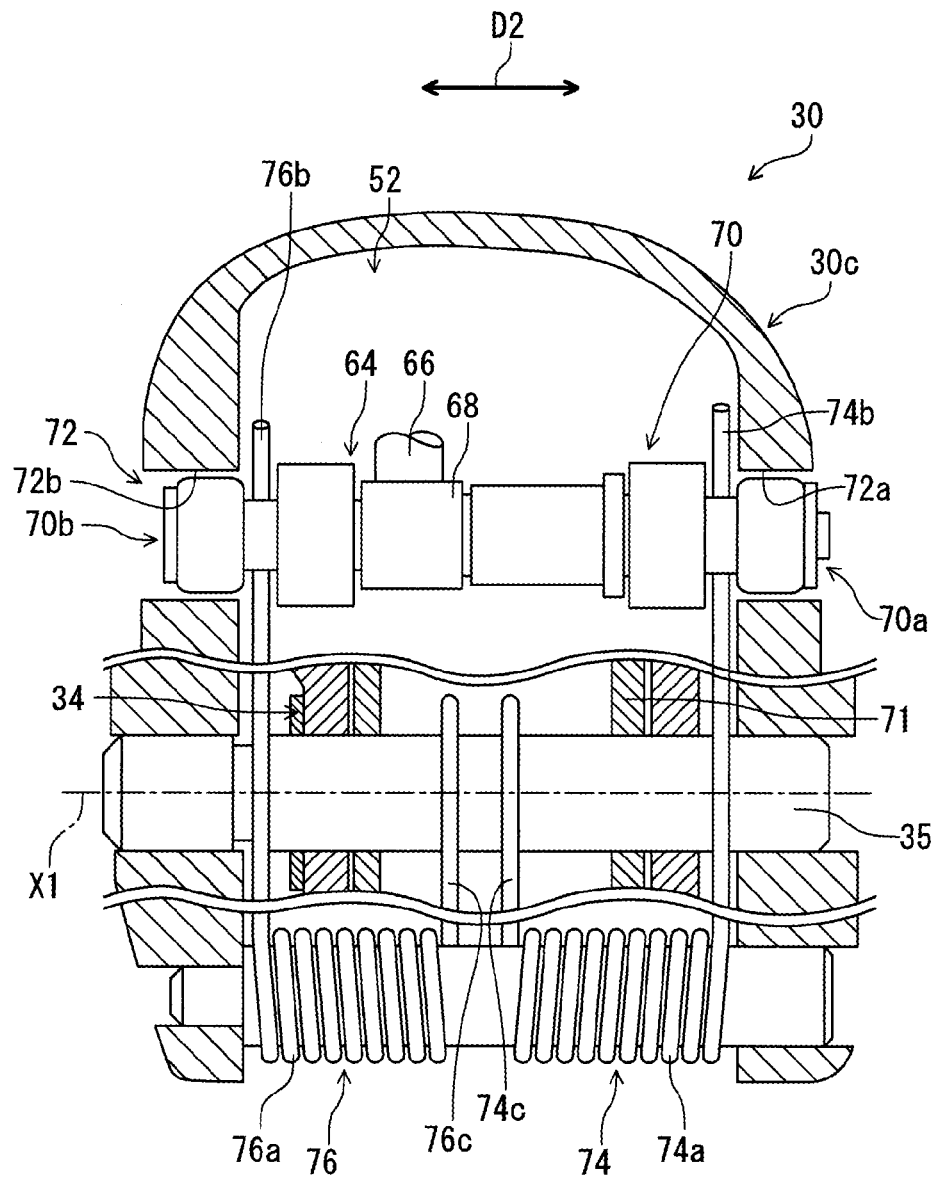
FIG. 3 is a partial schematic cross-sectional view of the bicycle hydraulic operating device illustrated in FIG. 1.

As illustrated in FIGS. 2 and 3, the intermediate member 64 includes a connecting rod 66, a connecting bracket 68, and a guide shaft 70. The connecting rod 66 is pivotally connected to the piston 48. The connecting bracket 68 is configured to pivotally connect the connecting rod 66 to the guide shaft 70. The guide shaft 70 is configured to contact the lever 34. More specifically, the lever 34 includes a cam member 71 configured to contact the guide shaft 70.

As seen in FIGS. 2 and 3, the bracket 30 includes a guide structure 72 configured to guide the intermediate member 64 to move the piston 48 between the initial position P11 and the actuated position P12. More specifically, as seen in FIG. 3, the guide structure 72 includes a first guide groove 72a and a second guide groove 72b. The guide shaft 70 includes a first guide end portion 70a and a second guide end portion 70b. The guide shaft 70 extends in an axial direction D2 defined along a pivot axis. The first guide end portion 70a and the second guide end portion 70b are oppositely arranged in the axial direction D2. The first guide groove 72a is configured to guide the first guide end portion 70a. The second guide groove 72b is configured to guide the second guide end portion 70b.

As illustrated in FIGS. 2 and 3, the bicycle hydraulic operating device 10 further includes a first biasing member 74 and a second biasing member 76. The first biasing member 74 and the second biasing member 76 are provided outside the hydraulic cylinder 46 with the hydraulic cylinder 46 located therebetween.

The first biasing member 74 and the second biasing member 76 are operatively coupled to the piston 48 and the lever 34 outside the hydraulic cylinder 46 such that the first biasing member 74 and the second biasing member 76 bias the piston 48 towards the initial position P11 and bias the lever 34 towards the rest position P1 (FIG. 1). The intermediate member 64 is configured to contact the lever 34 to apply biasing force of the first biasing member 74 and the second biasing member 76 to the lever 34.

As seen in FIG. 3, each of the first biasing member 74 and the second biasing member 76 is a torsion spring. The first biasing member 74 includes a main body 74a, a first end portion 74b, and a second end portion 74c. The second biasing member 76 includes a main body 76a, a first end portion 76b, and a second end portion 76c. The main bodies 74a and 76a are a coiled part of the torsion spring. The main bodies 74a and 76a are supported by a support shaft provided on the bracket 30. The first end portions 74b and 76b, and the second end portions 74c and 76c extend from the main bodies 74a and 76a respectively. The first end portions 74b and 76b are configured to engage with the intermediate member 64 to bias the piston 48 towards the initial position P11 (FIG. 2). The first end portion 74b of the first biasing member 74 engages with the first guide end portion 70a of the intermediate member 64. The first end portion 76b of the second biasing member 76 engages with the second guide end portion 70b of the intermediate member 64.

Figure 4:
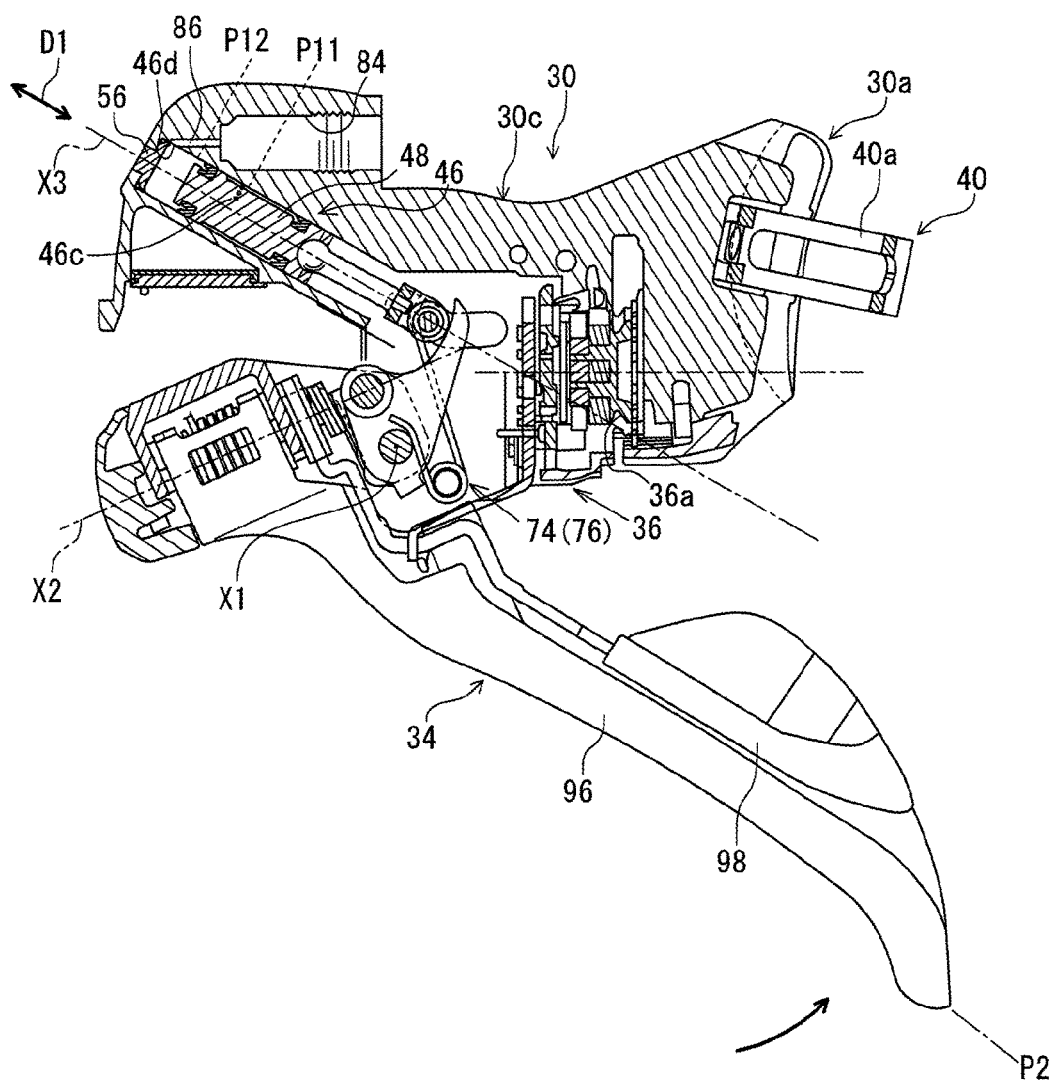
FIG. 4 is a partial cross-sectional view of the bicycle hydraulic operating device of FIG. 1 but showing an actuated position.

As illustrated in FIG. 4, when the lever 34 is pivoted around the pivot axis X1 relative to the bracket 30, the piston 48 moves within the hydraulic cylinder 46 against the biasing forces of the first biasing member 74 and the second biasing member 76. Operation of the lever 34 causes the hydraulic fluid to move from the hydraulic cylinder 46 to a slave piston or pistons (not shown) in the hydraulic brake device to apply frictional resistance. Of course, the bicycle hydraulic operating device 10 can be applied to any kind of a bicycle hydraulic component.

As shown in FIG. 2, the bicycle hydraulic operating device 10 further includes a fluid reservoir tank 82. The fluid reservoir tank 82 is configured to store hydraulic fluid for generating hydraulic pressure. The hydraulic fluid can be supplied from the fluid reservoir tank 82 to the hydraulic cylinder 46 even if the necessary amount of the hydraulic fluid increases due to wearing of a friction material (for example, a brake pad) of the hydraulic brake device. The fluid reservoir tank 82 also can reduce changes in the hydraulic pressure applied to the hydraulic brake device 12 due to swelling and contraction caused by changes in the temperature of the hydraulic fluid. The fluid reservoir tank 82 communicates with the first port 46c of the hydraulic cylinder 46 via a reservoir passage (not shown).

The bracket 30 includes an attachment bore 84 configured to be attached the hose 16 thereto. The bracket 30 further includes a passage 86 fluidly connecting the attachment bore 84 to the second port 46d of the hydraulic cylinder 46. The passage 86 has a smaller diameter than the attachment bore 84.

The attachment bore 84 is provided on the bracket 30 and is a bore formed in the bracket 30. At least part of the attachment bore 84 is arranged in an area A that radially surrounds the hydraulic cylinder 46. In the illustrated embodiment, the entire attachment bore 84 is arranged in the area A. The attachment bore 84 is connected with the hydraulic cylinder 46 so that fluid flows through the attachment bore 84 in response to movement of the piston 48. Thus, the hydraulic cylinder 46 and the attachment bore 84 are both defined by bores formed in the bracket 30. The attachment bore 84 includes a step 84a.

As shown in FIG. 2, the attachment bore 84 further includes a first diameter section 84b, and a second diameter section 84c. The second diameter section 84c has a larger diameter than the first diameter section 84b. The second diameter section 84c is arranged further from the passage 86 than the first diameter section 84*b*. In other words, the second diameter section 84*c* is arranged further from the hydraulic cylinder 46 than the first diameter section 84*b* in the downstream direction of fluid flow during actuation of the brake. The step 84*a* is formed between the first diameter section 84*b* and the second diameter section 84*c*. The second diameter section 84*c* has a threaded portion 84*d*. The threaded portion 84*d* receives the end of the hose 16, as shown in FIG. 1 and is described in more detail below.

Figure 1A:
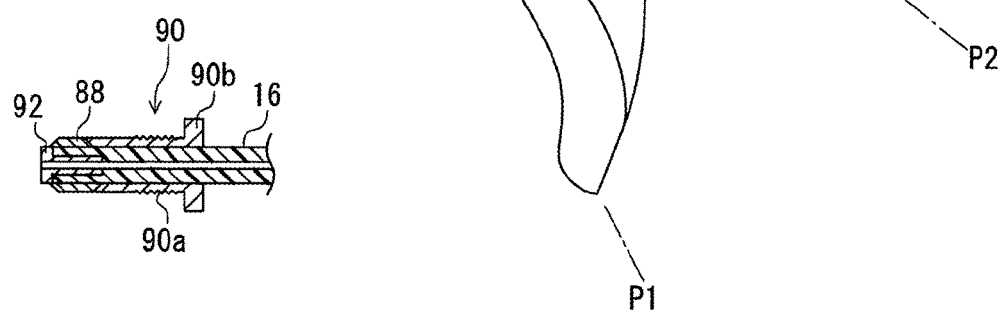
FIG. 1A is a cross sectional view showing details of a connecting bolt of FIG. 1A and related fitting parts.

As shown in FIGS. 1 and 1A, the bicycle hydraulic operation device further includes a compression sleeve 88, and a connecting bolt 90. The connecting bolt 90 has threads 90*a* and a head 90*b*. The hose 16 extends through the connecting bolt 90 and the compression sleeve 88. The connecting bolt 90 is adapted to be threaded to the threaded portion 84*d* of the attachment bore 84 to compress the compression sleeve 88 between the step 84*a* and the connecting bolt 90 to form a seal between the hose 16 and the attachment bore 84. A connector insert 92 is fitted in the end of the hose 16.

In the illustrated embodiment, the step 84*a* is formed between the large diameter section 84*c* and the small diameter section 84*b*. However, the attachment bore 84 may have a constant diameter, and the step can be formed by the bottom of the bore 84. In other words, the step can be formed between the bore 84 and the passage 86. The step can take any of several forms as long as it provides a stop or abutment for the compression fitting that includes the bolt 90 and the compression sleeve 88.

As indicated by FIGS. 1 and 4, the piston 48 is farther away from the handlebar H (bicycle part) in the actuated position P12 than in the rest position P11. The outside opening of the attachment bore 84 faces toward the handlebar H in a state where the bracket 30 is attached to the handle H in a normal use position. In other words, the opening of the attachment bore 84 faces toward the rider (not shown) in a state where the bracket 30 is attached to the handlebar H in a normal use position.

Regarding the orientation and location of the attachment bore 84, as shown in FIG. 2, the angle formed between the cylinder axis X3 of the hydraulic cylinder 46 and a bore axis X4 of the attachment bore 84 is equal to or less than 90 degrees. The attachment bore 84 is closer to the distal end portion 30*b* of the bracket 30 than the proximal end portion 30*a* of the bracket 30. Further, at least part of the attachment bore 84 is arranged in the area A of the bracket 30. In other words, at least part of the attachment bore 84 is spaced from the hydraulic cylinder 46 in a radial direction of the cylinder axis X3. This results in an efficient connection and minimizes the number of parts involved in the connection. No specialized fittings or intermediate parts are required to connect the attachment bore 84 with the hydraulic cylinder 46. Further, the attachment bore 84 is angled properly for directing the hose 16 in an optimal direction to avoid interference with the rider and other moving parts.

Further, in the illustrated embodiment as shown in FIG. 2, the attachment bore 84 and the passage 86 are axially aligned along the bore axis X4, and the passage 86 intersects the wall of the hydraulic cylinder 46 near the second end 46*b* of the hydraulic cylinder 46. Thus, the passage 86 is linear and direct. That is, there are no turns in the passage 86 between the second port 46*d* and the attachment bore 84, which maximizes the efficiency of the connection and simplifies manufacturing.

Although the bore axis X4 is shown to be horizontal in FIG. 3, the bore axis X4 can be angled by varying degrees with respect to the cylinder axis of the hydraulic cylinder 46, as long as the attachment bore faces generally rearward, toward the rider, or toward the handlebar H, and it is preferred that the angle between the cylinder axis X3 and the bore axis X4 is less than 90 degrees. Further, it is not required that the passage 86 is coaxial with the attachment bore 84, however, it is preferred that the passage 86 is linear and forms an angle with the cylinder axis X3 that is less than 90 degrees.

Returning to FIG. 2, the lever 34 is configured to rotate about a shift axis X5, which differs from the pivot axis X1, and is operatively connected to the mechanical shifting unit 36 in response to rotational movement of the lever 34 around the shift axis X5. More specifically, the lever 34 includes a lever support bracket 94, a first operating lever 96, a second operating lever 98, a first return spring 100, and a second return spring 102.

As seen in FIGS. 1-3, the lever support bracket 94 is supported by the pivot shaft 35 pivotally relative to the bracket 30 around the pivot axis X1. The lever support bracket 94 is coupled to the cam member 71 to be integrally rotatable around the pivot axis X1. The first operating lever 96 and the second operating lever 98 are pivotally supported around the shift axis X5 relative to the bracket 30 by the lever support bracket 94. In the illustrated embodiment, the shift axis X5 is coaxial with the longitudinal axis X2 when the lever 34 is located at the rest position P1.

Figure 5:
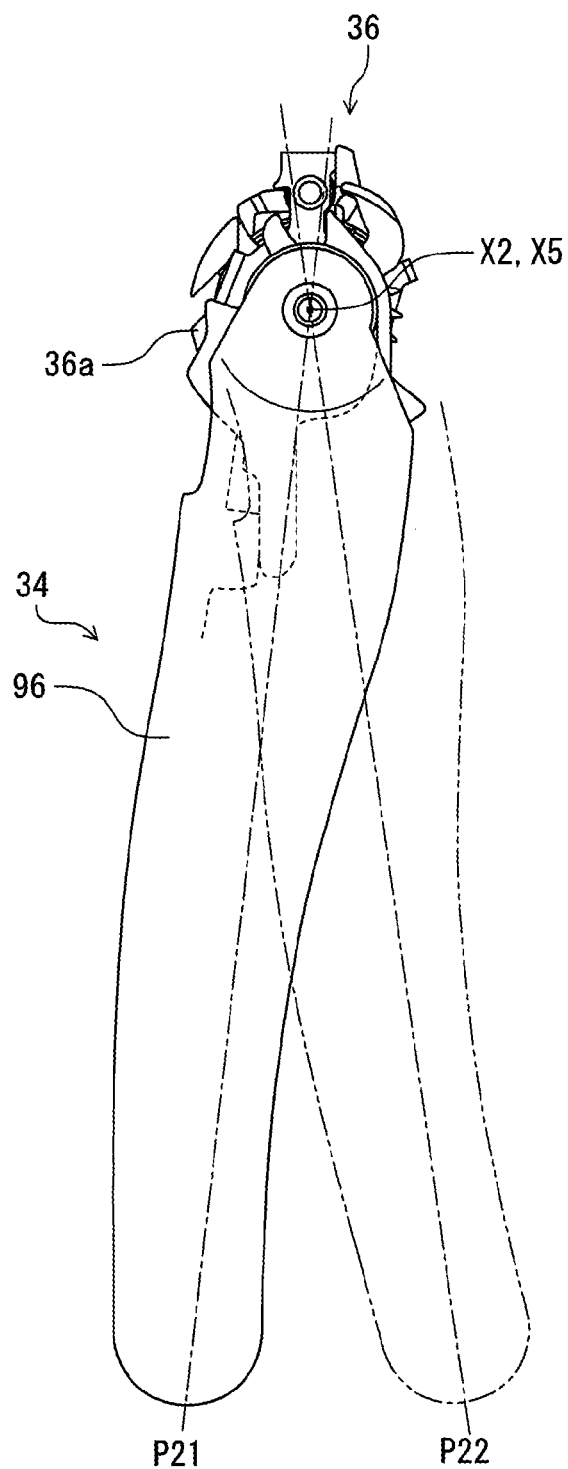
FIG. 5 is a partial front view of a first operating lever and a mechanical shifting unit of the bicycle hydraulic operating device illustrated in FIG. 1.

As illustrated in FIG. 5, the first operating lever 96 is pivotally provided around the shift axis X5 relative to the bracket 30 between a first rest position P21 and a first shift position P22. The first operating lever 96 is pivoted toward the first shift position P22 to rotate the take-up member 36*a* of the mechanical shifting unit 36 in the take-up direction. The first return spring 100 (FIG. 2) is configured to bias the first operating lever 96 from the first shift position P22 towards the first rest position P21.

Figure 6:
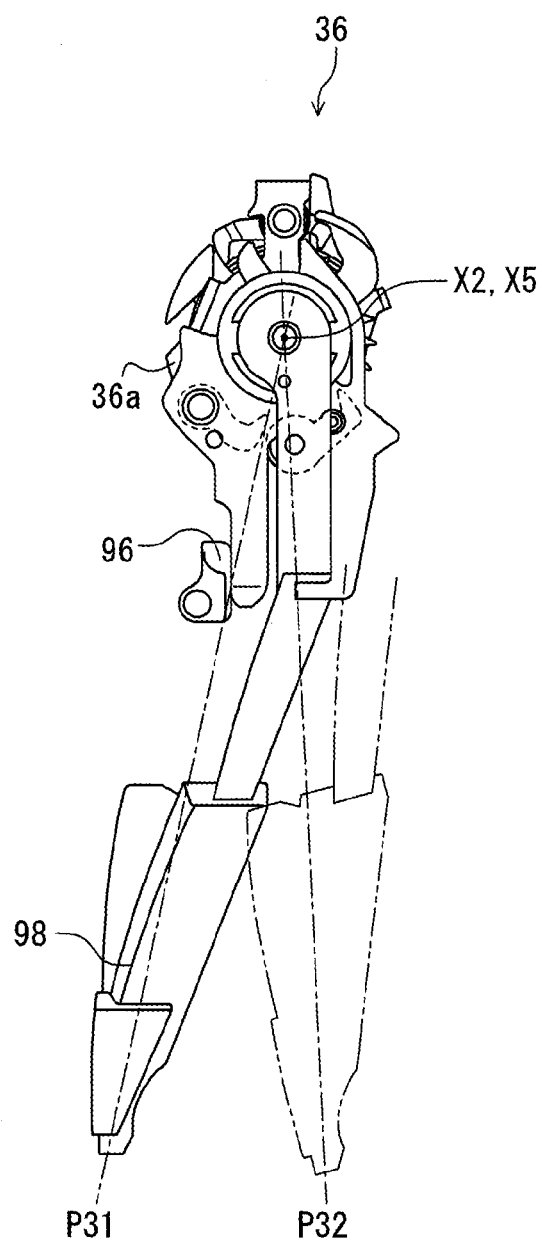
FIG. 6 is a partial front view of a second operating lever and the mechanical shifting unit of the bicycle hydraulic operating device illustrated in FIG. 1.

As illustrated in FIG. 6, the second operating lever 98 is pivotally provided around the shift axis X5 relative to the bracket 30 between a second rest position P31 and a second shift position P32. The second return spring 102 (FIG. 2) is configured to bias the second operating lever 98 from the second shift position P32 towards the second rest position P31. The second operating lever 98 is pivotally provided together with the first operating lever 96 when the first operating lever 96 is pivoted. The second operating lever 98 is pivotally provided in a state where the first operating lever 96 is positioned at the first rest position P21. The second operating lever 98 is pivoted toward the second shift position P32 to rotate the take-up member 36*a* of the mechanical shifting unit 36 in the release direction.

Second Embodiment

A bicycle hydraulic operating device 210 in accordance with the second embodiment will be described below referring to FIG. 7. Elements having substantially the same function as those in the first embodiment will be numbered the same here, and will not be described again in detail.

Figure 7:
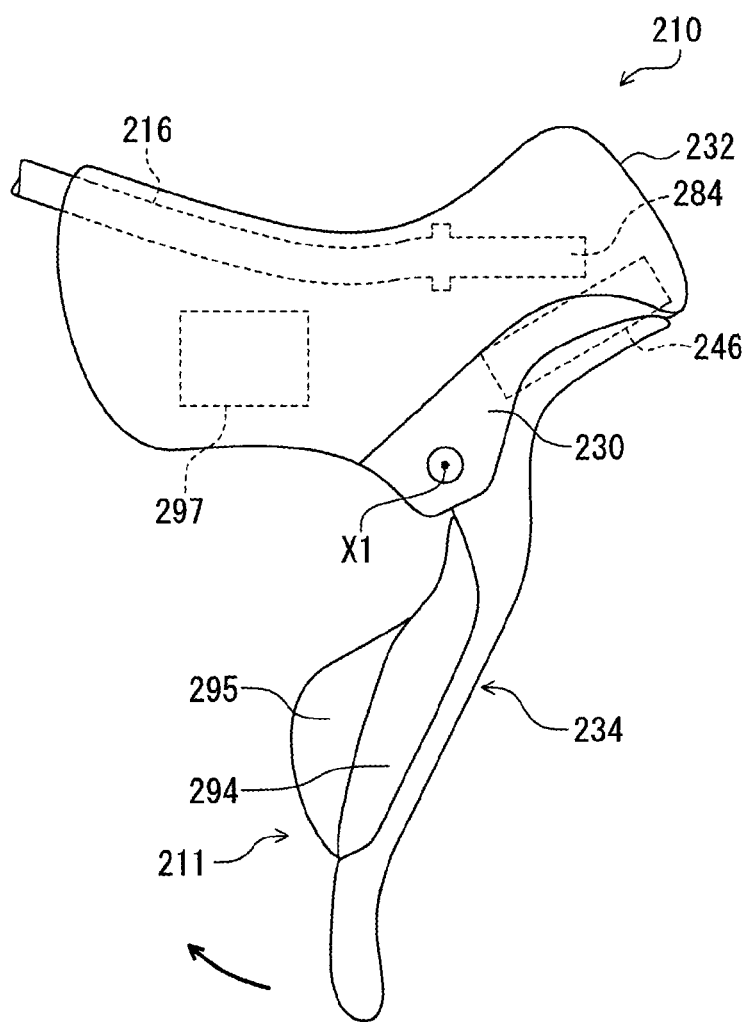
FIG. 7 is a schematic side view of a bicycle hydraulic operating device in accordance with a second embodiment.

As seen in FIG. 7, the bicycle hydraulic operating device 210 includes a bracket 230, a lever 234, a cover 232, and a hose 216, which correspond to similarly numbered parts in the first embodiment. In addition, the hydraulic operating device 210 includes an electric switch unit 211. The electric switch unit 211 is provided on at least one of a bracket 230 and the lever 234 and is configured to be electrically connected to a bicycle electric component, as described below. In the illustrated embodiment, the electric switch unit 211 is provided on the lever 234. However, it will be apparent to those skilled in the bicycle field from the present disclosure that the electric switch unit 211 can be provided on the bracket 230, or on both the lever 234 and the bracket 230. A hydraulic cylinder 246 and an attachment bore 284 are provided on the bracket 230, and the hose 216 is attached to the attachment bore 284 in the same manner as the first embodiment.

The electric switch unit 211 is configured to perform gear shifting operations of a shifting device. The electric switch unit 211 is configured to be electrically connected to a bicycle electric component such as an electric transmission (not shown: e.g., an electric derailleur and an electric internal hub gear) via an electric cable (not shown). However, it will be apparent to those skilled in the bicycle field from the present disclosure that the electric switch unit 211 can be communicated with the bicycle electric component using wireless technology.

As seen in FIG. 7, the lever 234 or brake lever is configured to be pivotally provided around the first axis X1 relative to the bracket 230. Unlike the first operating lever 92 of the first embodiment, the lever 234 is pivotally provided only around the pivot axis X1 relative to the bracket 230. In other words, pivotal movement of the lever 234 is only used for the brake operation.

As seen in FIG. 7, the electric switch unit 211 includes a first operating member 294 and a second operating member 295. The first operating member 294 and the second operating member 295 are provided on the lever 234. Each of the first operating member 294 and the second operating member 295 is pivotal relative to the brake lever 234. The first operating member 294 is configured to be operated by a rider for downshifting, for example. The second operating member 295 is configured to be operated by a rider for upshifting, for example. It will be apparent to those skilled in the bicycle field from the present disclosure that the first operating member 294 and the second operating member 295 are not limited to the illustrated structure and arrangement, but rather other suitable structures and arrangements can be used as needed and/or desired.

As seen in FIG. 7, the bicycle hydraulic operating device 210 includes a control unit 297, or an electrical shifting control unit. Also, as shown in FIG. 7, the electrical shifting control unit 297 is provided on the bracket 30. The electric switch unit 211 is electrically connected to the control unit 297. The control unit 297 includes a microcomputer and is located in the bracket 230, for example. However, the control unit 297 can be remotely located if needed and/or desired. Since various electrical shifting systems are known in the bicycle field, the electric switch unit 211, and the control unit 297 will not be discussed herein for the sake of brevity.

Although the switch unit 211 in the illustrated embodiment of FIG. 7 has a first operating member 294 and a second operating member 295, the switch unit can be constructed to have a single lever (not shown) in which upshifting and downshifting are performed according to the pivot angle of the single lever.

In the above embodiments, the term "attached" or "attaching", as used herein, encompasses configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" or "element" when used in the singular can have the dual meaning of a single part or a plurality of parts.

The ordinal numbers in the terms "first", "second" or the like recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

While the invention has been described in detail with respect to specific embodiments, those skilled in the art, upon attaining an understanding of the specific embodiments, may readily conceive of alterations, variations, and equivalents to these embodiments. Accordingly, the scope of the invention should be assessed as that of the appended claims and their equivalents.

What is claimed is:

1. A bicycle hydraulic operation device comprising:
a bracket configured to be attached to a bicycle part, wherein the bracket includes a grip portion configured to be gripped by a rider;
a grip cover attached to the bracket to at least partially cover the bracket, wherein the grip cover is made of elastic material;
a hydraulic cylinder provided in the bracket, wherein the hydraulic cylinder has a cylinder axis and a cylinder wall;
a port located on the cylinder wall;
a piston located within the hydraulic cylinder, wherein the piston is movable in an axial direction of the hydraulic cylinder; and
an attachment bore provided on the bracket, wherein
the attachment bore is connected with the hydraulic cylinder by a passage having no turns so that fluid flows through the attachment bore in response to movement of the piston, wherein the passage intersects the cylinder wall through a connection at the port,
the attachment bore includes a step,
at least part of the attachment bore is arranged in an area that radially surrounds the hydraulic cylinder, and
a part of the grip cover directly contacts a hose extending from the attachment bore,
wherein the bracket includes a proximal end portion, which is configured to be attached to the bicycle part, and a distal end portion, which is opposite to the proximal end portion, wherein the grip portion extends between the proximal end portion and the distal end portion, and the attachment bore is closer to the distal end portion than the proximal end portion.

2. The bicycle hydraulic operation device of claim 1, wherein the attachment bore has a threaded portion.

3. The bicycle hydraulic operation device of claim 2 further comprising a compression sleeve and a connecting bolt, wherein the hose extends through the connecting bolt and the compression sleeve, and the connecting bolt is adapted to be threaded to the threaded portion to compress the compression sleeve between the step and the connecting bolt.

4. The bicycle hydraulic operation device of claim 3, wherein the passage has a smaller diameter than the attachment bore.

5. The bicycle hydraulic operation device of claim 4, wherein the attachment bore includes a first diameter section, the step, and a second diameter section, wherein the second diameter section has a larger diameter than the first diameter section and is arranged further from the hydraulic cylinder than the first diameter section, and the step is formed between the first diameter section and the second diameter section.

6. The bicycle hydraulic operation device of claim 1, wherein the hydraulic cylinder and the attachment bore are both defined by bores formed in the bracket.

7. The bicycle hydraulic operation device of claim 1, wherein the piston moves between a rest position and an actuated position, wherein the piston is farther away from the bicycle part in the actuated position than in the rest position, and an opening of the attachment bore faces toward the bicycle part in a state where the bracket is attached to the bicycle part in a normal use position.

8. The bicycle hydraulic operation device of claim 1, wherein an angle formed between the cylinder axis of the hydraulic cylinder and a longitudinal axis of the attachment bore is equal to or less than 90 degrees.

9. The bicycle hydraulic operation device of claim 1 further comprising a mechanical shifting unit provided on the bracket.

10. The bicycle hydraulic operation device of claim 1 further comprising a lever pivotally mounted on the bracket, and an electrical switch unit provided on at least one of the bracket and the lever.

11. The bicycle hydraulic operation device of claim 1, wherein the attachment bore has a longitudinal axis and opens on an external surface of the bracket that is orthogonal to the longitudinal axis of the attachment bore and closer to the distal end portion than the proximal end portion.

12. The bicycle hydraulic operation device of claim 1, wherein
the attachment bore is configured to receive a connecting bolt having a head for connecting the hose to the bracket, and
an external surface of the bracket is orthogonal to a longitudinal axis of the attachment bore and is configured to come in contact with the head of the connecting bolt when the hose is connected to the bracket via the connecting bolt.

13. A bicycle hydraulic operation device comprising:
a bracket including a proximal end portion configured to be attached to a bicycle part, a distal end portion, which is opposite to the proximal end portion, and a grip portion, which extends between the proximal end portion and the distal end portion and is configured to be gripped by a rider;
a grip cover attached to the bracket to at least partially cover the bracket, wherein the grip cover is made of an elastic material;
a hydraulic cylinder provided in the bracket, wherein the hydraulic cylinder has a cylinder wall;
a port located on the cylinder wall;
a piston located within the hydraulic cylinder, wherein the piston is movable in an axial direction of the hydraulic cylinder; and
an attachment bore provided on the bracket, wherein
the attachment bore is connected with the hydraulic cylinder by a passage having no turns so that fluid flows through the attachment bore in response to movement of the piston, wherein the passage intersects the cylinder wall through a connection at the port,
the attachment bore includes a step,
the attachment bore is closer to the distal end portion than the proximal end portion, and
a part of the grip cover directly contacts a hose extending from the attachment bore.

14. The bicycle hydraulic operation device of claim 13, wherein the hydraulic cylinder has a cylinder axis, and at least part of the attachment bore is arranged in an area radially surrounding the hydraulic cylinder.

15. The bicycle hydraulic operation device of claim 13 further comprising a mechanical shifting unit provided on the bracket.

16. The bicycle hydraulic operation device of claim 13 further comprising a lever pivotally mounted on the bracket, and an electrical switch unit provided on at least one of the bracket and the lever.

17. A bicycle hydraulic operation device comprising:
a bracket including a grip portion configured to be gripped by a rider;
a grip cover attached to the bracket to at least partially cover the bracket, wherein the grip cover is made of an elastic material;
a mechanical shifting unit provided on the bracket;
a hydraulic cylinder provided in the bracket, wherein the hydraulic cylinder has a cylinder wall;
a port located on the cylinder wall;
a piston located within the hydraulic cylinder, wherein the piston is movable in an axial direction of the hydraulic cylinder; and
an attachment bore provided on the bracket, wherein
the attachment bore is connected with the hydraulic cylinder by a passage having no turns so that fluid flows through the attachment bore in response to movement of the piston, wherein the passage intersects the cylinder wall through a connection at the port,
the attachment bore includes a step, and
a part of the grip cover directly contacts a hose extending from the attachment bore,
wherein the bracket includes a proximal end portion, which is configured to be attached to a bicycle part, and a distal end portion, which is opposite to the proximal end portion, wherein the grip portion extends between the proximal end portion and the distal end portion, and the attachment bore is closer to the distal end portion than the proximal end portion.

18. The bicycle hydraulic operation device of claim 17, wherein the hydraulic cylinder has a cylinder axis, and at least part of the attachment bore is arranged in an area radially surrounding the hydraulic cylinder.

* * * * *